US010705176B2

(12) United States Patent
Mesecher

(10) Patent No.: US 10,705,176 B2
(45) Date of Patent: Jul. 7, 2020

(54) SIGNAL DIRECTION PROCESSING FOR AN ANTENNA ARRAY

(71) Applicant: David K. Mesecher, Melville, NY (US)

(72) Inventor: David K. Mesecher, Melville, NY (US)

(73) Assignee: NORTHROP GRUMMAN SYSTEMS CORPORATION, Falls Church, VA (US)

(*) Notice: Subject to any disclaimer, the term of this patent is extended or adjusted under 35 U.S.C. 154(b) by 372 days.

(21) Appl. No.: 14/882,034

(22) Filed: Oct. 13, 2015

(65) Prior Publication Data

US 2017/0102445 A1 Apr. 13, 2017

(51) Int. Cl.

| | |
|---|---|
| ***G01S 3/32*** | (2006.01) |
| ***G01S 3/46*** | (2006.01) |
| ***H04B 7/08*** | (2006.01) |
| ***H01Q 3/26*** | (2006.01) |
| ***H04K 3/00*** | (2006.01) |

(52) U.S. Cl.

CPC ................ *G01S 3/32* (2013.01); *G01S 3/325* (2013.01); *G01S 3/46* (2013.01); *H01Q 3/2611* (2013.01); *H01Q 3/2629* (2013.01); *H01Q 3/2635* (2013.01); *H04B 7/086* (2013.01); *H04B 7/0854* (2013.01); *H04K 3/224* (2013.01)

(58) Field of Classification Search

CPC ... G01S 3/38; G01S 3/32; G01S 3/325; H04B 7/0854; H04B 7/086; H04K 3/224; G01R 29/10; H01Q 3/2605; H01Q 3/2611; H01Q 3/2629; H01Q 3/2635

USPC .......................................................... 342/383

See application file for complete search history.

(56) References Cited

U.S. PATENT DOCUMENTS

| | | | | | |
|---|---|---|---|---|---|
| 4,313,116 | A * | 1/1982 | Powell | H04B 7/086 | 342/380 |
| 5,028,931 | A * | 7/1991 | Ward | G01S 7/2813 | 342/380 |
| 5,107,273 | A * | 4/1992 | Roberts | H01Q 3/2611 | 342/375 |
| 5,369,412 | A * | 11/1994 | Tsujimoto | H01Q 3/2629 | 342/380 |
| 5,493,307 | A * | 2/1996 | Tsujimoto | H01Q 3/2629 | 342/375 |

(Continued)

OTHER PUBLICATIONS

Dietrich, Carl B. "Adaptive Arrays and Diversity Antenna Configurations for Handheld Wireless Communication Terminals" Virginia Tech Dissertations (http://hdl.handle.net/10919/27291 ), Chap. 3. pp. 29-52. Feb. 2000 (Year: 2000).*

(Continued)

*Primary Examiner* — Gregory C. Issing

(74) *Attorney, Agent, or Firm* — Tarolli, Sundheim, Covell & Tummino LLP

(57) ABSTRACT

Systems and methods are provided for determining a direction of a signal received at an antenna array. An antenna array includes a plurality of antenna elements, including a reference element. A signal combiner element is configured to combine weighted signals from a subset of the plurality of antenna elements to provide a composite output. An adaptive processing component is configured to determine an optimal set of weights for the subset of the plurality of antenna elements. An angle of arrival search component is configured to find a direction of minimum gain given the optimal set of weights.

12 Claims, 3 Drawing Sheets

400
ADAPTIVE PROCESSOR 458
ANGLE OF ARRIVAL SEARCH 470
ANALOG RF TO DIGITAL BASEBAND CONVERSION 420
Σ 460
410 415 414 413 412 454 453 452 462

(56) References Cited

U.S. PATENT DOCUMENTS

| | | | | |
|---|---|---|---|---|
| 5,812,090 | A * | 9/1998 | Chevalier | H04B 7/0854 342/378 |
| 5,875,216 | A * | 2/1999 | Martin | H04B 1/0003 375/347 |
| 5,940,033 | A * | 8/1999 | Locher | H01Q 3/2611 342/19 |
| 6,084,540 | A * | 7/2000 | Yu | G01S 3/28 342/13 |
| 6,115,409 | A * | 9/2000 | Upadhyay | H01Q 3/2605 370/487 |
| 6,289,004 | B1 * | 9/2001 | Mesecher | H01Q 1/246 370/286 |
| 6,292,135 | B1 * | 9/2001 | Takatori | H01Q 3/2605 342/378 |
| 6,300,905 | B1 | 10/2001 | Chen et al. | |
| 6,421,007 | B1 | 7/2002 | Owen et al. | |
| 6,483,478 | B2 * | 11/2002 | Yu | G01S 13/4436 342/372 |
| 6,771,220 | B1 * | 8/2004 | Ashe | G01S 19/21 342/14 |
| 6,867,735 | B2 * | 3/2005 | Song | H04B 7/0854 342/377 |
| 6,894,643 | B2 * | 5/2005 | Guo | H04B 7/0851 342/372 |
| 7,139,592 | B2 * | 11/2006 | Leifer | H01Q 3/2611 455/562.1 |
| 7,333,056 | B2 | 2/2008 | Kishigami et al. | |
| 7,539,273 | B2 * | 5/2009 | Struckman | G01S 3/74 342/373 |
| 7,671,800 | B2 | 3/2010 | Lee | |
| 8,115,679 | B2 * | 2/2012 | Falk | H01Q 3/2635 342/380 |
| 8,633,863 | B2 | 1/2014 | Desclos et al. | |
| 2001/0019952 | A1 * | 9/2001 | Ishida | H04W 16/28 455/414.1 |
| 2002/0061051 | A1 * | 5/2002 | Kitahara | H04B 7/0617 375/144 |
| 2002/0097783 | A1 * | 7/2002 | Kimata | H01Q 3/2605 375/147 |
| 2003/0190933 | A1 * | 10/2003 | Higbie | H01Q 3/2629 455/562.1 |
| 2004/0088610 | A1 * | 5/2004 | Kobayakawa | H04B 7/0854 714/701 |
| 2006/0286955 | A1 * | 12/2006 | Yoshida | H01Q 3/2605 455/277.2 |
| 2008/0068266 | A1 * | 3/2008 | Deagro | G01S 7/2813 342/424 |
| 2012/0105285 | A1 | 5/2012 | Park et al. | |
| 2013/0252568 | A1 | 9/2013 | Woodsum | |
| 2015/0301185 | A1 * | 10/2015 | Shin | G01R 29/10 342/357.62 |

OTHER PUBLICATIONS

Spong, Robert. “Efficient Methods for Computing Azimuth Estimates From Amplitude Monopulse Ratios.” IEEE 1998 National Radar Conference, May 1998. pp. 307-312. (Year: 1998).*

Zheng, Yaohua. “Adaptive Antenna Array Processing for GPS Receivers.” Thesis submitted—The University of Adelaide. Jul. 2008. pp. 1-115. (Year: 2008).*

Zheng, Y. “Adaptive Antenna Array Processing for GPS Receiver.” Jul. 2008. pp. 1-115. (Year: 2008).*

Godara, L> “Smart Antennas”. CRC Press. 2004. pp. 1-458. (Year: 2004).*

* cited by examiner

SIGNAL DIRECTION PROCESSING FOR AN ANTENNA ARRAY

TECHNICAL FIELD

The present invention relates generally to communications systems, and more particularly to signal direction processing for an antenna array.

BACKGROUND

In many applications it is of interest to determine the direction of arrival of a signal, such as cellular phones and other radio communication system. The determination of a direction of arrival of a received signal from one communications unit can be used to maximize the sensitivity of an antenna array of a second communications system to that direction as well as the directionality of the signal power transmitted in a return transmission. Determining an angle of arrival can also be useful in identifying malicious signals, for example, spoofing or jamming signals intended to disrupt operation of a radio frequency communication system or navigation system. For emergency (e.g., 911) calls from a mobile telephone, direction of arrival can also be used to locate the caller when global positioning system (GPS) data is not available.

SUMMARY

In accordance with an example, a system is provided for determining a direction of a signal received at an antenna array. An antenna array includes a plurality of antenna elements, including a reference element. A signal combiner element is configured to combine weighted signals from a subset of the plurality of antenna elements to provide a composite output. An adaptive processing component is configured to determine an optimal set of weights for the subset of the plurality of antenna elements. An angle of arrival search component is configured to find a direction of minimum gain given the optimal set of weights.

In accordance with another example, a method is provided for determining a direction of a signal received at an antenna array. A signal is received at a plurality of antenna elements, including a reference element. Weights are applied to received signals at a subset of the plurality of antenna elements. The weighted signals from a subset of the plurality of antenna elements are combined to provide a composite output. An optimal set of weights are determined for the subset of the plurality of antenna elements as a set of weights that minimize a mean squared error between the composite output and an output of the reference element. An angle of arrival is determined for the signal from the determined optimal set of weights.

In accordance with still another example, a system is provided for determining a direction of a signal received at an antenna array. An antenna array includes a plurality of antenna elements, including a reference element. A signal combiner element is configured to combine weighted signals from a subset of the plurality of antenna elements to provide a composite output. An adaptive processing component is configured to determine an optimal set of weights for the subset of the plurality of antenna elements as a set of weights that minimize a mean squared error between the composite output and an output of the reference element. An angle of arrival search component is configured to find a direction of minimum gain given the optimal set of weights.

DETAILED DESCRIPTION OF INVENTION

Using the systems and methods described herein, it is possible to determine the direction of arrival (DOA) of a signal in space using an antenna array with any conventional element placement. Traditional interferometry techniques for locating signal direction require antenna arrays having very specific element spacing. The inventor has determined that a determination of signal direction can be accomplished more accurately than interferometry techniques by applying minimum mean squared error (MMSE) processing techniques to find a set of array element weights through analysis of the sampled signal space such that the resulting response pattern of the array will have a spatial null in the direction of the signal of interest. The response pattern of the antenna, given these array element weights, can be analyzed to reveal the DOA of the signal of interest.

Figure 1:
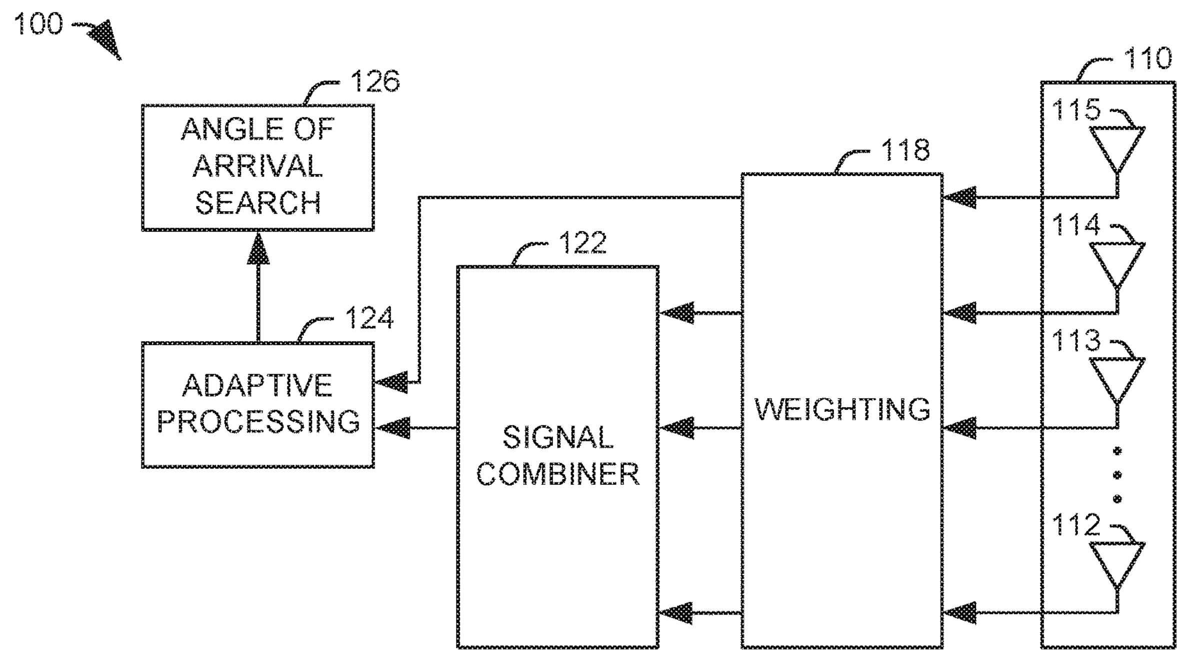
FIG. 1 illustrates a system for determining a direction of a signal received at an antenna array.

FIG. 1 illustrates a system 100 for determining a direction of a signal received at an antenna array. The system 100 includes an antenna array 110 that includes a plurality of antenna elements 112-115. A reference element 115 can be selected from the plurality of antenna elements for use in the analysis. A subset of the signals from the plurality of antenna elements are provided to a weighting element 118, configured to apply one of a set of array element weights to each of the subset of signals. It will be appreciated that the subset of the antenna elements can be a proper subset of the plurality of antenna elements or an improper subset, such that all of the signals received that the antenna array 110 are weighted.

A signal combiner component 122 is configured to combine the weighted signals from the subset of the plurality of antenna elements to provide a composite output. An adaptive processing component 124 receives the weighted signals and determines an optimal set of weights for the subset of the plurality of antenna elements. When a signal is being received, the weights can be selected to manipulate the directional pattern of the array, for example, to increase gain in the direction of an incoming signal. In the direction finding application of FIG. 1, however, the weights are determined by correlating the reference signal to the output signal, for example, via a minimum mean squared error (MMSE) processing technique. The resulting signal pattern will have a well-defined null in the direction of the signal.

An angle of arrival search component 126 can then utilize the set of weights to search for a direction of minimum gain, given the set of weights, to determine the direction of the signal. For example, for each of a plurality of angles of arrival, an output value can be calculated, given the response pattern defined by the set of weights and the known values at each of the plurality of elements 112-115. An minimum value in the response pattern can be found by searching a range of possible values iteratively, such that at one or more coarse levels of quantization are searched to narrow the range of possible values before a final fine level of quantization is used to find the angle of arrival with a desired degree of precision. In one implementation, the angle of arrival search component 126 can vary the angle of arrival to be searched in ten degree increments, then one degree increments, then tenth of a degree increments to provide accuracy within a tenth of a degree. It will be appreciated, however, that finer degrees of precision may be available in some applications.

Figure 2:
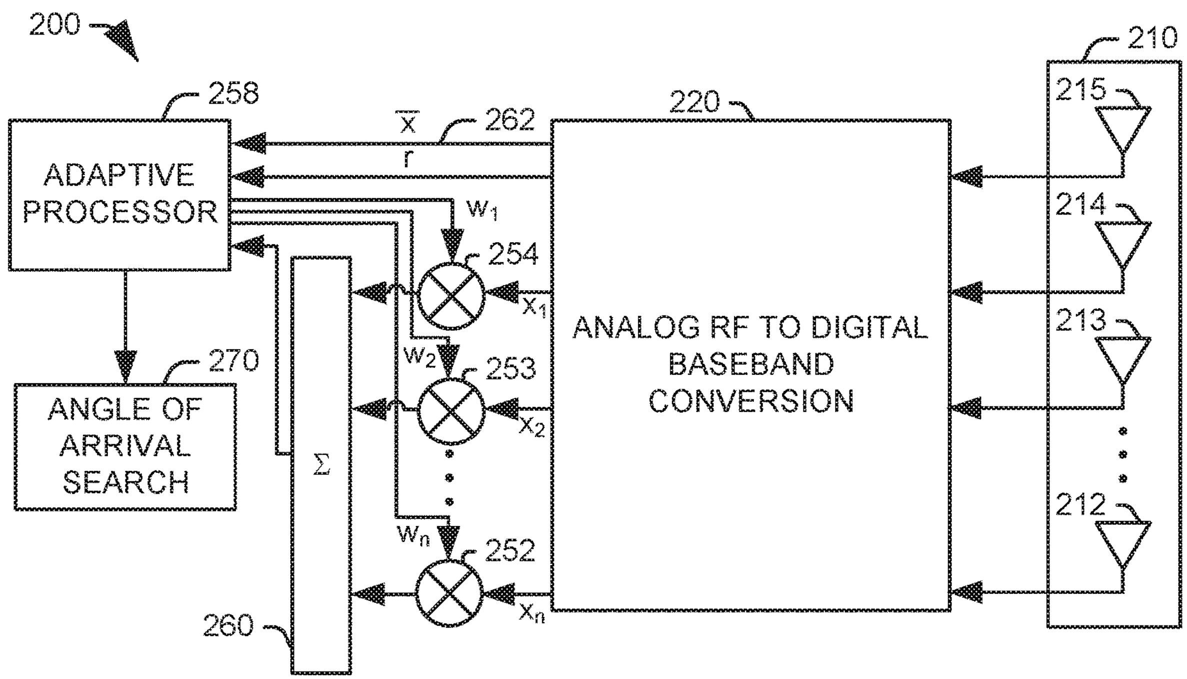
FIG. 2 illustrates an example implementation of a communications system with an antenna array utilizing direction finding.

FIG. 2 illustrates an example implementation of a communications system 200 with an antenna array 210 utilizing the direction finding of the present invention. In this example, it is assumed that the signal is relatively strong, but the signal is unknown to the system, for example, where no training sequence is available for the signal. In the illustrated implementation, RF signal energy is received by each of the antenna elements 212-215, including a reference element 215. The received signals are then provided to an analog RF to digital baseband conversion apparatus 220, which converts the received analog signals to digital baseband signals. This conversion can be done through any appropriate signal processing architecture for producing digital baseband signals. In one implementation, the signals are down converted at respective mixer assemblies using an RF carrier reference from a local oscillator, digitized at respective analog-to-digital converters, and provided to respective digital downconverters to provide digital baseband signals.

All of the digital baseband signals, other than the signal representing the output of the reference element 215, are then weighted at respective multipliers 252-254 with a set of weights provided from an adaptive processor 258, and combined at an associated signal combiner 260 to provide an output for the antenna array. In the illustrated implementation, the weight set is obtained by using an adaptive beam steering algorithm that seeks to minimize the mean square error between the antenna array output and the output of the reference element 215. The optimal Minimum Mean Square Error (MMSE) weights are given by:

$$\overline{w}=(E[\overline{x}\overline{x}^*])^{-1}E[\overline{x}r^*] \qquad \text{Eq. 1}$$

where x is a vector of signal values 262 from the plurality of antenna elements, the superscript * denotes a complex conjugate of a term, and r is the output of the reference element.

Figure 3:
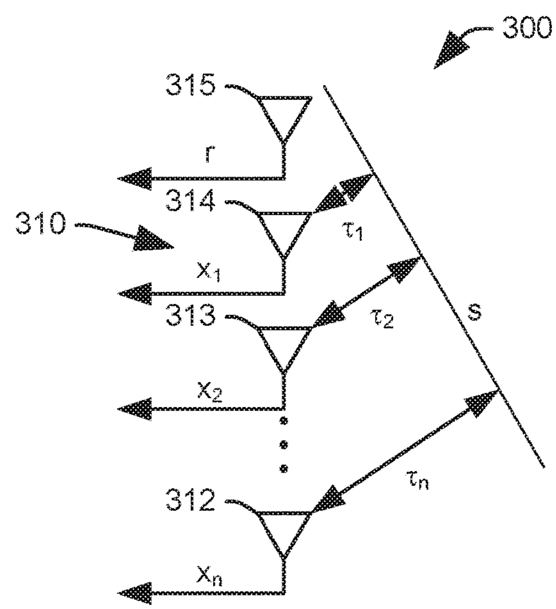
FIG. 3 illustrates a schematic example of a plane wave representing the signal, s, impinging on an antenna array including elements, including a reference element.

FIG. 3 illustrates a schematic example 300 of a plane wave representing the signal, s, impinging on an antenna array 310 with a plurality of elements 312-315, including a reference element 315. It will be appreciated from the diagram, that each non-reference element 312-314 will have a delay relative to the reference signal that is dependent on the direction of arrival of the signal on the array. The signal values at the non-reference elements can therefore be expressed as:

$$\overline{x}=\begin{bmatrix} s\cdot e^{j\phi_1} \\ s\cdot e^{j\phi_2} \\ \vdots \\ s\cdot e^{j\phi_n} \end{bmatrix}+\begin{bmatrix} \tilde{n}_1 \\ \tilde{n}_2 \\ \vdots \\ \tilde{n}_n \end{bmatrix} \qquad \text{Eq. 2}$$

where s is the signal, $n_i$ is the thermal noise at an $i^{th}$ element, λ is a wavelength of the signal, c is the speed of light in a vacuum, $\tau_i$ is the delay of the $i^{th}$ element relative to the reference element, and $$\phi_i=\frac{2\pi\tau_i c}{\lambda}.$$

The cross-correlation matrix, $E\{\overline{xx}^*\}$, of the signals seen by the elements can then be described as:

$$E\{\overline{xx}^*\}=P_s\times\begin{bmatrix} 1 & e^{j(\phi_2-\phi_1)} & \dots & e^{j(\phi_n-\phi_1)} \\ e^{j(\phi_1-\phi_2)} & 1 & \dots & e^{j(\phi_n-\phi_2)} \\ \vdots & \vdots & \ddots & \vdots \\ e^{j(\phi_1-\phi_n)} & e^{j(\phi_2-\phi_n)} & \dots & 1 \end{bmatrix}+P_n\times I \qquad \text{Eq. 3}$$

where $P_s$ is the signal power and $P_n$ is the thermal noise power generated by receivers associated with the plurality of elements.

Returning to FIG. 2, an angle of arrival search component 270 can then utilize the set of weights to search for a direction of minimum gain, given the set of weights, to determine the direction of the signal. An optimal value can be found by searching a range of possible values iteratively, such that at one or more coarse levels of quantization are searched to narrow the range of possible values before a final fine level of quantization is used to find the angle of arrival with a desired degree of precision. In the illustrated implementation, one implementation, the angle of arrival search component 270 can vary angle of arrival in ten degree increments, then one degree increments, then tenth of a degree increments, and finally in hundredth of a degree increments to provide accuracy within one-hundredth of a degree. It will be appreciated, however, that finer degrees of precision may be available in some applications.

Figure 4:
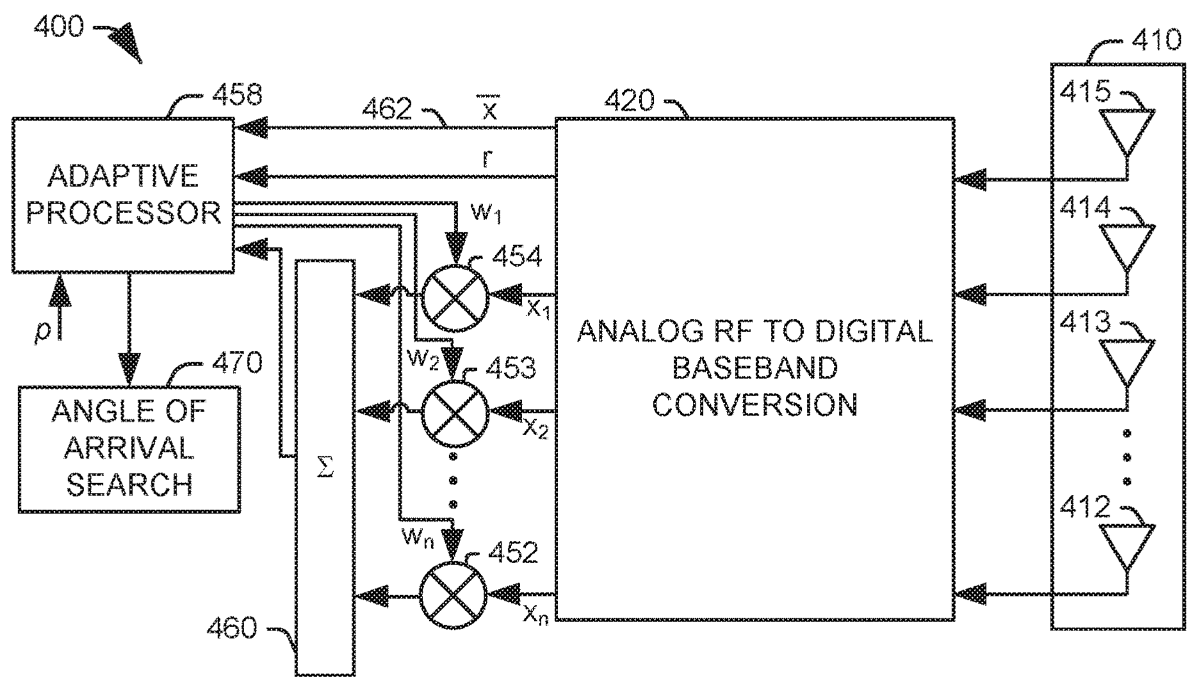
FIG. 4 illustrates an example implementation of a communications system with an antenna array utilizing direction finding.

FIG. 4 illustrates an example implementation of a communications system 400 with an antenna array 410 utilizing the direction finding of the present invention. In this example, it is assumed that the signal is relatively weak, but the signal is known to the system, such that an appropriate replica signal, p, is available, where p is equivalent to the signal, s, within a scalar constant, γ, such that p=γs. Knowledge of the value of the scalar constant is not necessary for effective function of the illustrated communications system 400. For example, the signal can be a pilot signal from a cooperative transmitter. In the illustrated implementation, RF signal energy is received by each of the antenna elements 412-415, including a reference element 415, and provided to an analog RF to digital baseband conversion apparatus 420, which converts the received analog signals to digital baseband signals. This conversion can be done through any appropriate signal processing architecture for producing digital baseband signals. In one implementation, the signals are down converted at respective mixer assemblies using an RF carrier reference from a local oscillator, digitized at respective analog-to-digital converters, and provided to respective digital downconverters to provide digital baseband signals.

All of the digital baseband signals, other than the signal representing the output of the reference element 415, are then weighted at respective multipliers 452-454 with a set of weights provided from an adaptive processor 458, and combined at an associated signal combiner 460 to provide an output for the antenna array. In the illustrated implementation, the weight set is obtained by using an adaptive beam steering algorithm that seeks to minimize the mean square error between the antenna array output and the output of the reference element 415. In one implementation, the optimal Minimum Mean Square Error (MMSE) weights are given by:

$$\overline{w}=(E[\overline{qq}^*])^{-1}E[\overline{x}r^*] \quad \text{Eq. 4}$$

where $\overline{q}=E\{\overline{x}p^*\}$, $\overline{x}$ is a vector of signal values 462 from the plurality of antenna elements, the superscript * denotes a complex conjugate of a term, and r is the output of the reference element.

Referring back to FIG. 3 and Eq. 4, the vector $\overline{q}$ can be expressed as:

$$\overline{q}=E\{\overline{x}\cdot p^*\}=E\left\{\left(\begin{bmatrix} s\cdot e^{j\phi_1}\\ s\cdot e^{j\phi_2}\\ \vdots\\ s\cdot e^{j\phi_n}\end{bmatrix}+\begin{bmatrix}\tilde{n}_1\\ \tilde{n}_2\\ \vdots\\ \tilde{n}_n\end{bmatrix}\right)\cdot p^*\right\}=\gamma P_S\begin{bmatrix} s\cdot e^{j\phi_1}\\ s\cdot e^{j\phi_2}\\ \vdots\\ s\cdot e^{j\phi_n}\end{bmatrix} \quad \text{Eq. 5}$$

where s is the signal, $n_i$ is the thermal noise at an $i^{th}$ element, $\lambda$ is a wavelength of the signal, c is the speed of light in a vacuum, $\tau_i$ is the delay of the $i^{th}$ element relative to the reference element, $P_s$ is the signal power, and $$\phi_i=\frac{2\pi\tau_i c}{\lambda}.$$

From Eq. 5, the matrix $\overline{qq}$ can be expressed as:

$$\overline{qq}^*=\gamma^2P_S^2\begin{bmatrix} 1 & e^{j(\phi_2-\phi_1)} & \dots & e^{j(\phi_n-\phi_1)}\\ e^{j(\phi_1-\phi_2)} & 1 & \dots & e^{j(\phi_n-\phi_2)}\\ \vdots & \vdots & \ddots & \vdots\\ e^{j(\phi_1-\phi_n)} & e^{j(\phi_2-\phi_n)} & \dots & 1\end{bmatrix} \quad \text{Eq. 6}$$

It will be appreciated that this matrix lacks the thermal noise present in the blind nulling solution of FIG. 2 and Eq. 3. To this end, in another implementation, an approximation of the thermal noise introduced at the receiver, $C_n$, can be used in conjunction with the replica signal, which lacks the noise introduced at the receiver. In this case, the optimal Minimum Mean Square Error (MMSE) weights are given by:

$$-\overline{w}=(E[\overline{qq}^*]+C_n)^{-1}E[\overline{x}r^*] \quad \text{Eq. 7}$$

where $\overline{q}=E\{\overline{x}p^*\}$, $\overline{x}$ is the vector of signal values 462 from the plurality of antenna elements, the superscript * denotes a complex conjugate of a term, and r is the output of the reference element, $C_n=\alpha E\{\overline{nn^*}\}$, $\overline{n}=\text{rand}(m,1)$, m is a minimum noise value, and $\alpha$ is a design parameter.

Returning to FIG. 4, an angle of arrival search component 470 can then utilize the set of weights to search for a direction of minimum gain, given the set of weights, to determine the direction of the signal. An optimal value can be found by searching a range of possible values iteratively, such that one or more coarse levels of quantization are searched to narrow the range of possible values before a final fine level of quantization is used to find the angle of arrival with a desired degree of precision. In the illustrated implementation, the angle of arrival search component 470 can search the angles of arrival in ten degree increments, then one degree increments, then tenth of a degree increments, then in hundredth of a degree increments, and finally in to provide accuracy within three-thousandths of a degree. It will be appreciated, however, that finer degrees of precision may be available in some applications.

Figure 5:
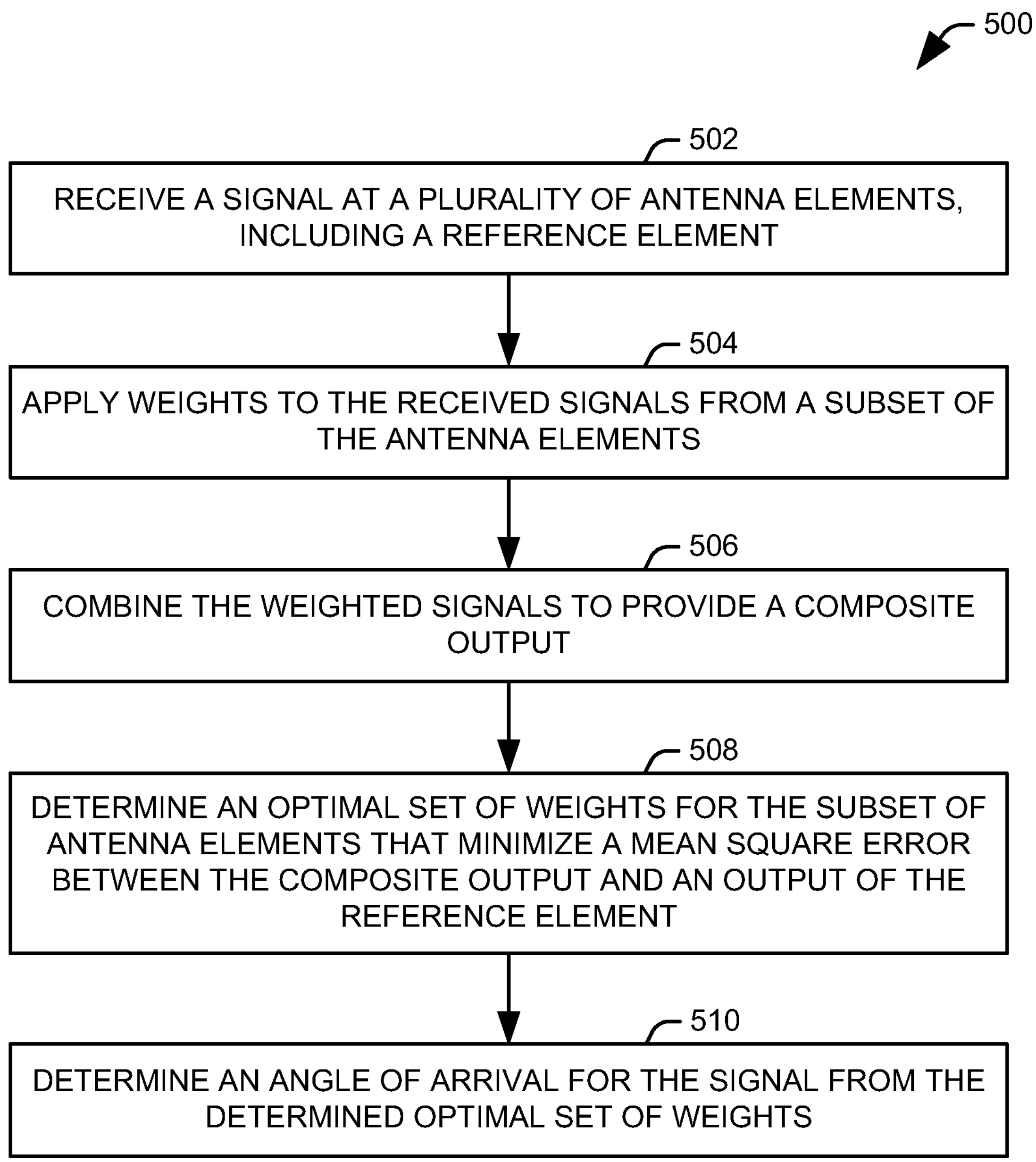
FIG. 5 illustrates an exemplary method for determining a direction of a signal received at an antenna array.

In view of the foregoing structural and functional features described above, a methodology in accordance with various aspects of the present invention will be better appreciated with reference to FIG. 5. While, for purposes of simplicity of explanation, the methodology of FIG. 5 is shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect the present invention.

FIG. 5 illustrates an exemplary method 500 for determining a direction of a signal received at an antenna array. At 502, a signal is received at a plurality of antenna elements, including a reference element. At 504, weights are applied to received signals at a subset of the plurality of antenna elements. It will be appreciated that the subset can be a proper subset or an improper subset of the plurality of elements. At 506, the weighted signals from a subset of the plurality of antenna elements are combined to provide a composite output.

At 508, an optimal set of weights are determined for the subset of the plurality of antenna elements as a set of weights that minimize a mean squared error between the composite output and an output of the reference element. At 510, an angle of arrival for the signal is determined from the determined optimal set of weights. In one implementation, the angle of arrival is determined by finding a direction of minimum gain given the optimal set of weights. For example, a range of possible angles can be searched iteratively, with the iterative search including performing a first search at a coarse quantization level to narrow the range of possible angles and performing a final search at a fine quantization level to determine the angle of arrival.

What has been described above includes exemplary implementations of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

Having described the invention, the following is claimed:

1. A system for determining a direction of a signal of interest having known properties from a signal received at an antenna array comprising:

an antenna array, comprising a plurality of antenna elements, including a reference element, each of the plurality of antenna elements providing one element of a vector of signal values;

a signal combiner element configured to combine weighted signals from a subset of the plurality of antenna elements to provide a composite output;

an adaptive processor configured to determine a set of weights for a subset of the plurality of antenna elements by correlating a reference signal, received at the reference element, to the composite output, such that the set of weights provides a response pattern having a well-defined null in the direction of the signal received at the antenna array, wherein correlating the reference signal to the composite output comprises calculating a product of an inverse of a matrix derived from the vector of signal values and an expected value of the product of the vector of signal values and the output of the reference element; and an angle of arrival search component configured to search the response pattern to find a direction of minimum gain, representing the direction of the signal of interest, the angle of arrival search component calculating a gain for each of a plurality of angles of arrival from the set of weights and selecting an angle of arrival of the plurality of angles of arrival having a smallest gain as the direction of the signal of interest;

wherein the adaptive processor determines a cross-correlation of the vector of signal values and a complex conjugate of a locally generated replica signal that is linearly proportional to the signal of interest to determine the matrix derived from the vector of signal values.

2. The system of claim 1, wherein the adaptive processor is configured to determine the matrix derived from the vector of signal values as a cross-correlation, such that the adaptive processor is configured to calculate the set of weights, $\overline{w}$, as, $\overline{w}=(E[\overline{q}\overline{q}^*])^{-1}E[\overline{x}r^*]$, where $\overline{x}$ is the vector of signal values, the superscript * denotes a complex conjugate of a term, $\overline{q}=E\{\overline{x}p^*\}$, p is the locally generated replica of the signal of interest, and r is the output of the reference element.

3. The system of claim 1, wherein the adaptive processor is configured to determine the matrix as a sum of a cross-correlation and an approximation of a covariance matrix of thermal noise in the receiver, such that the adaptive processor is configured to calculate the set of weights, $\overline{w}$ as, $\overline{w}=(E[\overline{q}\overline{q}^*]+C_n)^{-1}E[\overline{x}r^*]$, where $\overline{x}$ is the vector of signal values, the superscript * denotes a complex conjugate of a term, $\overline{q}=E\{\overline{x}p^*\}$, p is the locally generated replica of the signal of interest, $C_n$ is the approximation of a covariance matrix of the thermal noise in the receiver, and r is the output of the reference element.

4. The system of claim 1, wherein the angle of arrival search component is configured to iteratively search across a range of possible angles, such that a first search is performed at a coarse quantization level to narrow the range of possible angles and a final search is performed at a fine quantization level to determine the angle of arrival.

5. The system of claim 4, wherein the first search is performed in increments of ten degrees, and the final search is performed in increments of one hundredth of a degree.

6. A method for determining a direction of a signal of interest having known properties from a signal received at an antenna array comprising:

receiving a signal at a plurality of antenna elements as a vector of signal values, the plurality of antenna elements including a reference element that provides a reference signal;

applying weights to received signals at a subset of the plurality of antenna elements;

combining the weighted signals from a subset of the plurality of antenna elements to provide a composite output;

determining an optimal set of weights for the subset of the plurality of antenna elements that minimize a mean squared error between the composite output and an output of the reference element, such that the optimal set of weights provides a response pattern having a well-defined null in the direction of the signal received at the antenna array, wherein determining the optimal set of weights comprises:

determining a cross-correlation of the vector of signal values and a locally generated replica signal that is linearly proportional to the signal of interest;

determining a matrix from the cross-correlation; and determining the set of weights as a product of an inverse of the matrix determined from the cross-correlation and an expected value of the product of the vector of signal values and the reference signal; and determining an angle of arrival for the signal of interest from the set of weights, said determining the angle of arrival comprising:

calculating a value for the gain for each of a plurality of angles of arrival from the set of weights; and selecting an angle of arrival of the plurality of angles of arrival having a smallest gain as the angle of arrival of the signal.

7. The method of claim 6, wherein determining the angle of arrival for the signal from the set of weights by searching the response pattern comprises iteratively searching across a range of possible angles, the iterative search comprising:

selecting the plurality of angles of arrival to represent a coarse quantization level to narrow the range of possible angles; and selecting the plurality of angles of arrival to represent a fine quantization level to determine the angle of arrival.

8. The method of claim 6, wherein determining the matrix from the cross-correlation comprises determining the matrix as the cross-correlation, such that the set of weights, $\overline{w}$, is determined as, $\overline{w}=(E[\overline{q}\overline{q}^*])^{-1}E[\overline{x}r^*]$, where $\overline{x}$ is a vector of signal values from the subset of plurality of antenna elements, the superscript * denotes a complex conjugate of a term, $\overline{q}=E\{\overline{x}p^*\}$, p is the locally generated replica of the signal of interest, and r is the output of the reference element.

9. The method of claim 6, wherein determining the matrix from the cross-correlation comprises determining the matrix derived from the vector of signal values as a sum of the cross-correlation and an approximation of a covariance matrix of thermal noise in the receiver, such that the set of weights, $\overline{w}$, is determined as, $\overline{w}=(E[\overline{q}\overline{q}^*]+C_n)^{-1}E[\overline{x}r^*]$, where $\overline{x}$ is a vector of signal values from the subset of the plurality of antenna elements, the superscript * denotes a complex conjugate of a term, $\overline{q}=E\{\overline{x}p^*\}$, p is the locally generated replica of the signal of interest, $C_n$ is an approximation of a covariance matrix of the thermal noise in the receiver, and r is the output of the reference element.

10. The method of claim 6, wherein the subset of the plurality of antenna elements is an improper subset of the plurality of antenna elements.

11. A system for determining a direction of a signal of interest having known properties from a signal received at an antenna array comprising:

an antenna array, comprising a plurality of antenna elements, including a reference element;

a signal combiner element configured to combine weighted signals from a subset of the plurality of antenna elements to provide a composite output;

an adaptive processor configured to determine a set of weights for the subset of the plurality of antenna elements that minimize a mean squared error between the composite output and an output of the reference element, by calculating the set of weights, $\overline{w}$, as $\overline{w}=(E[\overline{q}\overline{q}^*])^{-1}E[\overline{x}r^*]$, where $\overline{x}$ is a vector of signal values from a subset of plurality of antenna elements, the superscript * denotes a complex conjugate of a term, $\overline{q}=E\{\overline{x}p^*\}$, p is a locally generated replica of the signal received at the antenna array, and r is the output of the reference element; and an angle of arrival search component configured to find a direction of minimum gain given the set of weights, such that a value for the gain is calculated for each of a plurality of angles of arrival from the set of weights and an angle of arrival of the plurality of angles of arrival having a smallest gain is selected as the direction of the signal of interest.

12. The system of claim 11, wherein the angle of arrival search component is configured to iteratively search across a range of possible angles, such that a first search is performed at a coarse quantization level to narrow the range of possible angles and a final search is performed at a fine quantization level to determine the angle of arrival.

* * * * *